United States Patent [19]

Jacobson et al.

[11] 4,143,213
[45] Mar. 6, 1979

[54] CELLS HAVING CATHODES CONTAINING CHALCOGENIDE COMPOUNDS OF THE FORMULA $M_aFeX_b$ AND SPECIES THEREOF EXHIBITING ALKALI METAL INCORPORATION

[75] Inventors: Allan J. Jacobson, Princeton; M. Stanley Whittingham, Fanwood, both of N.J.

[73] Assignee: Exxon Research & Engineering Co., Florham Park, N.J.

[21] Appl. No.: 900,198

[22] Filed: Apr. 26, 1978

[51] Int. Cl.² ............................................. H01M 6/36
[52] U.S. Cl. .................................... 429/112; 429/191; 429/194; 429/221
[58] Field of Search .............. 429/112, 103, 104, 191, 429/194, 218, 221

[56] References Cited

U.S. PATENT DOCUMENTS

| | | | |
|---|---|---|---|
| 4,049,879 | 9/1977 | Thompson et al. | 429/194 X |
| 4,074,019 | 2/1978 | Malachesky et al. | 429/191 X |

*Primary Examiner*—Charles F. LeFevour
*Attorney, Agent, or Firm*—Kenneth P. Glynn

[57] ABSTRACT

The present invention is directed to an electric current-producing cell which contains:
(a) an anode having as its anode-active material one or more alkali metals;
(b) a cathode having as its cathode-active material one or more compounds selected from the group consisting of:
  (i) chalcogenide compounds having the formula:

$$M_aFeX_b$$

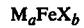

wherein M is a metal selected from the group consisting of sodium, potassium, rubidium, cesium, calcium, strontium and barium wherein X is a chalcogen selected from sulfur and selenium, wherein a is a numerical value of about 0.5 when M is a divalent metal and a is a numerical value of about 1 when M is a monovalent metal, and wherein b is a numerical value of about 2; and,
  (ii) species of chalcogenide compounds of said formula exhibiting alkali metal incorporation; and,
(c) an electrolyte which is chemically inert with respect to said anode and said cathode and which permits the migration of ions between said anode and said cathode.

16 Claims, No Drawings

CELLS HAVING CATHODES CONTAINING CHALCOGENIDE COMPOUNDS OF THE FORMULA $M_aFeX_b$ AND SPECIES THEREOF EXHIBITING ALKALI METAL INCORPORATION

BACKGROUND OF THE INVENTION

1. Field of the Invention

The present invention relates to electric current-producing cells, and more particularly to such cells employing specified cathode-active materials comprising metal-iron-chalcogen compounds and species thereof exhibiting alkali metal incorporation.

2. Prior Art

There has been considerable interest in recent years in developing high energy density batteries for vlotaic cells. Exemplary of the developing systems is a high energy density electrochemical cell utilizing compounds of the transition metal chalcogenides as cathode-active materials and using alkali metal anodes, e.g., as set forth in U.S. Pat. No. 4,009,052. U.S. Pat. No. 3,992,222 describes a cell having, for example, a lithium anode-active material, a molten electrolyte, and mixtures of $FeS_2$ and various metal sulfides as its cathode-active material. The background section of this patent describes similar systems using $FeS_2$ cathodes wherein solid phases of $Li_2FeS_2$ and $Li_4Fe_2S_5$ may be formed in the cathode during use at high temperatures. U.S. Pat. No. 3,907,589 describes electrochemical cells having alkali metal anodes, e.g. lithium, having molten salt electrolytes, and having cathodes containing mixtures of $FeS_2$ and $Li_2S$. U.S. Pat. No. 4,049,879 describes alkali metal anode, chalcogenide cathode cells wherein the cathode-active chalcogenides are transition metal phosphorus chalcogenides such as $Li_4FePS_3$, $K_6FePS_3$, $Li_3FePS_3$, $LiNaFePS_3$, $LiNaKFePS_3$, $LiK(NiFe)PS_3$ and the like. Argonne National Laboratory Report No. ANL-76-8 entitled "Proceedings of the Symposium And Workshop On Advanced Battery Research And Design, Mar. 22–24, 1976", pp. A-81 to A-87, teaches the state of the art for high-temperature batteries and describes, for example, the mechanisms involving various alkali metal-Fe-sulfur reactions, intermediate compounds and products in alkali metal/metal sulfide cells, including the formation of such compounds as $Li_2FeS_2$ and $K_2Fe_7S_8$ in the cathode.

Notwithstanding the considerable variety of high energy density electrochemical cell systems which have recently been developed, it is believed that the particular cells of the present invention have not been heretofore disclosed or rendered obvious.

SUMMARY OF THE INVENTION

The present invention is directed to an electric current-producing cell which contains:

(a) an anode having as its anode-active material one or more alkali metals;

(b) a cathode having as its cathode-active material one or more compounds selected from the group consisting of:

(i) chalcogenide compounds having the formula:

$$M_aFeX_b \qquad (1)$$

wherein M is a metal selected from the group consisting of sodium, potassium, rubidium, cesium, calcium, strontium and barium, wherein X is a chalcogen selected from sulfur and selenium, wherein a is a numerical value of about 0.5 when M is a divalent metal and is about 1 when M is a monovalent metal, and wherein b is a numerical value of about 2; and, (ii) species of chalcogenide compounds of said formula exhibiting alkali metal incorporation; and, (c) an electrolyte which is chemically inert with respect to said anode and said cathode and which permits the migration of ions between said anode and said cathode.

DETAILED DESCRIPTION OF THE INVENTION

As mentioned, the electric current-producing cell of the present invention is one which contains a specified anode, a functional electrolyte, and a cathode having as its cathode-active material, metal-iron-chalcogen compounds and compounds thereof incorporating at least some additional alkali metal.

In general, the anode employed in the cell of the present invention is one which contains as its anode-active material one or more metals selected from the group consisting of the Periodic Table Group IA metals. Of these Group IA metals, also known as the alkali metals, lithium and sodium are desirable. Preferred is the anode having lithium as its anode-active material. It should be noted that the alkali metals used in the anodes are meant to include both pure alkali metals and alloys containing these, e.g., lithium-aluminum alloys. The anode-active material may be in contact with other metal structures in the cell of the present invention, as desired. Thus, the anode-active materials, e.g. lithium, may be in contact with metal structures such as nickel, copper or silver screen, which serve as current collectors. These anode configurations are a matter of design and are well known in the art.

The cathode employed in the cell of the present invention is one which contains as its cathode-active material one or more compounds selected from the group consisting of:

(i) chalcogenide compounds having the formula:

$$M_aFeX_b \qquad (1)$$

wherein M is a metal selected from the group consisting of sodium, potassium, rubidium, cesium, calcium, strontium and barium, wherein X is a chalcogen selected from sulfur and selenium, wherein a is a numerical value of about 0.5 when M is a divalent metal and about 1 when M is a monovalent metal, and wherein b is a numerical value of about 2; and, (ii) species of chalcogenide compounds of said formula exhibiting alkali metal incorporation. The variable M is desirably a metal selected from the group of potassium and strontium, and is preferably potassium. The chalcogen X is, as mentioned, sulfur or selenium. Preferably, the chalcogen X is sulfur. Preferred compounds are those which have at least some lithium incorporated therein, such as $Li_nKFeS_2$ wherein n is, e.g., 0.1–0.4.

Among the cathode-active materials employed in the cells of the present invention are: $NaFeS_2$, $KFeS_2$, $RbFeS_2$, $CsFeS_2$, $Sr_{0.5}FeS_2$, and $Ba_{0.5}FeS_2$ (the last two compounds being also written respectively as $SrFe_2S_4$, $BaFe_2S_4$) as well as the selenium analogs thereof. Also contemplated are non-stoichiometric compounds such as $Ba_{0.52}FeS_2$, and the like. Additionally, mixtures of the variables in the formula above are contemplated, e.g. $Na_{0.25}K_{0.75}FeS_2$ and $KFeSeS$, etc. Further, species of any of the foregoing compounds having some alkali metal incorporated therein are among the cathode-active materials employed in the cells of the present invention, e.g. $LiKFeS_2$.

The compounds of Formula (1) above may be prepared by a number of techinques. For example, they may be prepared by reacting iron metal with the M metal carbonate and elemental chalcogen at elevated temperatures, e.g. 500° C. to 900° C., in an inert atmosphere, e.g. in nitrogen. Thus, $NaFeS_2$, $KFeS_2$, $RbFeS_2$, $CsFeS_2$, $NaFeSe_2$, $KFeSe_2$, $RbFeSe_2$, $CsFeSe_2$ and mixtures, mixed compounds, non-stoichiometric species, and analogous compounds employed therein may be prepared by this technique.

Alternatively, most of the chalcogenides used in the present invention, including those specifically cited in the preceding paragraph, may be prepared by reacting the M metal iron oxide, e.g., $KFeO_2$, with the hydrogen chalcogenide, e.g., $H_2S$, at elevated temperatures, e.g. 700° C. to 900° C. or so.

In yet another technique, these compounds may be prepared by reacting the M metal chacogenide, e.g. $Na_2S$, with elemental iron or the iron chalcogenide, e.g., $FeS_2$, and with elemental chalcogen, e.g., sulfur, in approximately stoichiometric amounts under vacuum, e.g. in a sealed evacuated silica tube.

For the strontium and barium compounds, a preferred preparation technique involves the iron exchange of the potassium iron chalcogenide with the strontium or barium being exchanged for the potassium. This method involves the mentioned ion exchange from aqueous solutions of the strontium or barium chloride followed by dehydration. For example, $KFeS_2$ in $BaCl_2$ (aqueous) will yield $Ba_{0.5}FeS_2$ (also written $BaFe_2S_4$). This method is more fully described in "Extended Abstracts of the V International Conference on Solid Compounds of The Transition Elements" by H. Boller, Uppsala, Sweden (1976), page 93.

The non-stoichiometric compounds such as $Ba_{1.05}Fe_2S_4$ may be prepared by direct reaction of the M metal chalcogenide with Fe or the iron chalcogenide in the presence of the elemental chalcogen as more fully set forth in *J. Solid State Chem.*, Vol. 11, page 128 (1974) by I. E. Grey.

The compounds of Formula (1) obtained by the above techniques are found to be based on edge-shared $FeS_4$ tetrahedral chains supported by the M metal atoms. They are, in general, characterized by X-ray diffraction techniques wherein this basis is observed. The species of chalcogenide compounds of Formula (1) which exhibit alkali metal incorporation may be prepared by electrochemical means and, in fact, may inherently be formed during cycling of cells of the present invention employing the Formula (1) compounds. Direct formation may be effected electrochemically by the ionic migration of the alkali metal into the chalcogenide Formula (1) compound. Alternatively, chemical techniques may be employed, e.g. by the reaction of the Formula (1) compound with n-butyl lithium.

These species of chalcogenide compounds containing alkali metal are believed to be characterized by a layered arrangement formed when the chains of the mentioned tetrahedral structure incorporate, at least in part, additional metal atoms, and these structures are spearated and supported by the M metal atoms. While this characterization has been supported by X-ray diffraction and Mössbauer spectroscopy measurements for the lithium-containing compounds, the exact characterization of the other alkali metal-containing species has not been determined and may or may not be identical. It is believed, however, that, whatever characterization may be concluded for other alkali metal-containing species, the Formula (1) compounds do incorporate lithium atoms as well as other alkali metal atoms.

Advantageously, the cathode-active materials used in the cells of the present invention may simply be hot pressed into a cathode structure, with or without supporting materials. The cathode-active material may be supported on structures such as carbon, copper, nickel, stainless steel, iron, etc., and it may be supported on such materials or it may be impregnated into such materials. In one preferred embodiment, the cathode does not contain any conductive diluents within the cathode active material, such as carbon. However, plastic binding agents such as polyfluoroethylene may be utilized if desired.

The electrolyte used in the cell of the present invention is any electrolyte which is chemically inert with respect to the anode and with respect to the cathode, and which permits the migration of ions between the anode and the cathode. The electrolyte may typically be a nonaqueous alkali metal salt-organic solvent electrolyte solution. These alkali metal salts are well known in the art and need not be enumerated herein. However, such salts include the lithium and sodium salt complexes which are dissolved in organic solvents such as inertly substituted and unsubstituted ethers, sulfones, organic sulfates, organic sulfites, organic nitrites and organic nitro compounds. One preferred electrolyte for use in conjunction with cells containing lithium as its cathode-active material is an electrolyte containing lithium perchlorate salt dissolved in dioxolane or a dioxolane-containing solution. Alternatively, the electrolyte may be a solid such as beta-alumina or an alkali metal halide, or a molten salt.

The electric current-producing cells of the present invention containing the above-mentioned anodes, cathodes and electrolytes not only have high energy densities, but are also capable of being cycled through charging and discharging, and may be readily produced on a large-scale basis.

The present invention is illustrated by the following examples, but the invention should not be construed by being limited thereto.

EXAMPLE 1

$KFeS_2$ was prepared by reaction of 10 g $K_2CO_3$, 2 g Fe and 11 g S in air at 900° C. for 2 hours and cooling to room temperature in 16 hours. Pure $KFeS_2$ in the form of large fibrous crystals was extracted from the melt with water. The $KFeS_2$ was mixed with 10% by weight of teflon powder and pressed into an expanded stainless steel mesh at 300° C. The grid has approximately 2 $cm^2$ of active cathode material. A cell was then prepared by surrounding the cathode with polypropylene separators and then pure lithium metal which served as the anode. The assembled cell was immersed into a 2 M solution of $LiClO_4$ in dioxolane. Initially, the cell was discharged at 1mA with a brief excursion to 2 mA. With the lower cut-off voltage at 1.3 volts, the total capacity on the first discharge was 61% of one lithium per $KFeS_2$. The first discharge leveled off at 1.56 volts and dropped smoothly down to 1.3 volts. However, the behavior on the second and subsequent discharges was markedly different. In the second discharge, the initial voltage was 2.06 volts and fell smoothly over the whole range. In subsequent cycles, the discharge curves were very similar to cycle 2. On cycle 14, the overall utilization was 64.5% of 1 Li.

After cycle 14, both the rate of discharge and recharge were increased to 2 mA and data for five complete cycles obtained. Initially, the utilization was 56.9% but rose to 59.9% on the fifth cycle. The rate of discharge was increased to 4 mA with a recharge of 2 mA. Similar behavior was observed, an initial drop to 57.3% followed by a rise to 62.4% after 20 complete cycles. With a 10 mA discharge rate, the capacity was initially 34.8%. Fifty complete cycles were run with a 10 mA discharge and a 2 mA recharge then the rate of discharge was dropped back to 2 mA. An immediate increase in capacity was observed which rose to a maximum of 75.4% on the 104th cycle. Note that this is higher than was observed between cycles 15 and 20 under the same conditions. On the 127th cycle, the rate of discharge was again increased to 4 mA and the utilization dropped to 54.7% averaged over cycles 127–134 and continued to fall steadily to 31% on the 455th cycle. At this point, both the discharge and recharge rates were lowered to 1 mA and 1 mA with again a substantial recovery in capacity to 77.5% averaged over cycles 455–460. Data under these conditions were collected for a total of 700 cycles. On the 700th cycle, there was still 35.7% capacity. A second grid prepared under the same conditions was examined in the scanning electron microscope. The fibrous nature of the material and a relatively open structure was apparent. The particles range in size but some are as large as $4\mu$ perpendicular to the fiber axis and $20\mu$ along the fiber axis.

EXAMPLE 2

$KFeS_2$ was prepared by reaction of $KFeO_2$ with pure $H_2S$ at 550° C. for 6 hours. The $KFeO_2$ was obtained by firing a stoichiometric mixture of $K_2CO_3$ and $Fe_2O_3$ at 1000° C. in air for 96 hours. $KFeS_2$ prepared in this way is a black free flowing fine powder. A cell was constructed as described in Example 1. The cell was discharged initially at 1 mA and behaved similarly to Example 1. The first discharge curve leveled off at close to 1.5 volts (somewhat lower than in example 1) and fell slowly to the lower cut off of 1.30 volts with a capacity of 48.4% of the theoretical value. On the second discharge, the voltage initially was higher as before and greater capacity was recovered on the recharge. Unlike Example 1, the overall capacity fell slowly and was 29.2% after 9 complete cycles. The rate of both charge and discharge were dropped to 0.5 mA with an increase in capacity to 44% which fell to 39% after a further 15 cycles. In general, the voltages observed were lower than those of Example 1, 40% of the discharge capacity occurring above 1.5 volts here compared with 75% in Example 1 after the same number of cycles. S.E.M. data for a grid of the same material prepared identically did not show the characteristic fibrous particle morphology but small irregular shaped particles clumped together. This sample preparation technique was found to be useful although the Example 1 technique is preferred.

EXAMPLE 3

A cell was constructed as in Example 1 but using a sample of $KFeS_2$ prepared by reaction of iron, $K_2CO_3$ and sulfur at 500° C. This preparation gave smaller crystallites and less preferred orientation in an X-ray powder diffraction pattern. The cells were discharged and recharged at 4 mA and 1 mA respectively with an average capacity of 69% of the theoretical capacity for one lithium over cycles 5–9. A further 75 cycles were obtained with a 2mA charge rate. The initial capacity was 58.2% which rose to a maximum on cycle 21 to 66.5% and then fell to 51.2% on cycle 84. The capacities at 4 mA discharge and 2 mA recharge is very comparable to Example 1 under the same conditions. Consequently, lowering the preparation temperature from 900° C. to 500° C. does not adverseley affect behavior. An SEM of a grid prepared from the same material under identical conditions shows that the cathode is very similar in structure to Example 1— is clearly fibrous with a comparable particle size distribution.

EXAMPLE 4

A cell was constructed as in Example 1 but the grid mixture contained 74.1 wt. % $KFeS_2$, 9.8 wt. % teflon and 16.1 wt. % graphite. The graphite was added as a conducting diluent. The $KFeS_2$ sample was crystalline material prepared by fusion at 900° C. and subsequently micronized to increase the surface area to 6.7 $m^2/g$. The cell was charged and discharged at 1 mA for total of 200 cycles. On the first discharge, the voltage fell fairly rapidly to 1.6 volts and then more slowly to 1.3 volts. The curve is not as flat as found in $KFeS_2$ samples without the conducting diluent but the difference is not great. The cell could also be initially recharged to a greater extent than in the other cases 76%, the second and subsequent discharges show a loss in capacity. The initial discharge capacity is 99.8% of that expected for reaction of one lithium/mole $KFeS_2$.

EXAMPLE 5

A sample of $SrFe_2S_4$ was prepared by dehydration of $Sr(H_2O)_6Fe_2S_4$ at 150° C. under $10^{-2}$ torr vacuum. The $Sr(H_2O)_6Fe_2S_4$ was prepared by ion exchanging $KFeS_2$ in 0.5 M aqueous strontium chloride. The dried sample had a BET surface area of 16.5 $m^2/g$. A grid was prepared in the usual way from a mixture of 80.1 wt. % $SrFe_2S_4$, 9.7 wt. % teflon and 10.2% graphite and a cell constructed as described in Example 1. The cell was discharged and recharged at 1 mA for a total of 60 cycles. The capacity on the first discharge was 94.9% of one lithium and 94.5% of this capacity was recovered on recharge. The capacity was still 75.3% a cycle 9.

EXAMPLE 6

A sample of $BaFe_2S_4$ was prepared by dehydration of $Ba(H_2O)_{3.8}Fe_2S_4$ at 100° C. in a vacuum of $10^{-2}$ torr. The $Ba(H_2O)_{3.8}Fe_2S_4$ was prepared by ion exchanging $KFeS_2$ in 0.5M aqueous $BaCl_2$. The $BaFe_2S_4$ was mixed with 10.5% teflon and pressed into an expanded stainless steel mesh first at room temperature and then at 300° C. A cell was constructed with this grid as described in Example 1. The cell was discharged and recharged at 1 mA between voltage limits of 2.72 and 1.60 volts. Little capacity was found between these voltage limits, 8% in 1st discharge and 4% on eighth discharge. For the 9th discharge the lower voltage limit was dropped to 1.30 volts and the utilization increased to 63.6%. The voltage composition plot was quite flat as found in previous examples and 59% of the capacity was recovered on recharge. On the second complete cycle the discharge is more smoothly varying from 2.5 volts. A total of 35 complete cycles were obtained during testing.

EXAMPLE 7

A cell was constructed as described in Example 6 except that the composition included 14.4 wt. % graphite, 75.5% $Ba_{.5}FeS_2$ and 10.1% graphite. The initial voltage limits were 2.72 and 1.6 volts. The initial two discharge cycles at 1 mA and 1 mA corresponded to only 8% utilization. For cycle three, the voltage limit was dropped to 1.30 volts and the cell discharged to 93.0% of capacity. The overall utilization on cycle 3 was 70.6%. The general path of the initial discharge to 1.3 volts closely paralleled the corresponding discharge in Example 6 suggesting that the addition of graphite had little effect.

What is claimed is:

1. An electric current-producing cell, comprising:
   (a) an anode having as its anode-active material one or more alkali metals;
   (b) a cathode having as its cathode-active material one or more compounds selected from the group consisting of:
      (i) chalcogenide compounds having the formula:

$$M_aFeX_b$$

wherein M is a metal selected from the group consisting of sodium, potassium, rubidium, cesium, calcium, strontium and barium, wherein X is a chalcogen selected from sulfur and selenium, wherein a is a numerical value of about 0.5 when M is a divalent metal and about 1 when M is a monovalent metal, and wherein b is a numerical value of about 2; and,
      (ii) species of any of the chalcogenide compounds of said formula exhibiting alkali metal incorporation; and,
   (c) an electrolyte which is chemically inert with respect to said anode and said cathode and which permits the migration of ions between anode and said cathode.

2. The cell of claim 1 wherein said metal M is selected from the group consisting of potassium and strontium.

3. The cell of claim 2 wherein said metal M is potassium.

4. The cell of claim 3 wherein said chalcogen X is sulfur.

5. The cell of claim 1 wherein said anode-active material is selected from the group consisting of lithium and sodium.

6. The cell of claim 5 wherein said metal M is selected from the group consisting of potassium and strontium.

7. The cell of claim 6 wherein said metal M is potassium.

8. The cell of claim 7 wherein said chalcogen X is sulfur.

9. The cell of claim 1 wherein said anode-active material is lithium and said cathode-active material exhibits lithium incorporation.

10. The cell of claim 9 wherein said metal M is selected from the group consisting of potassium and strontium.

11. The cell of claim 10 wherein said metal M is potassium.

12. The cell of claim 11 wherein said chalcogen X is sulfur.

13. The cell of claim 1 wherein the electrolyte solvent contains at least one cyclic ether.

14. The cell of claim 1 wherein said anode-active material is lithium, said cathode-active material is $KFeS_2$ and said electrolyte is a lithium salt dissolved is a solvent containing at least one organic ether.

15. The cell of claim 1 in which the electrolyte is a solid.

16. The cell of claim 1 in which the electrolyte is a molten salt.

* * * * *